United States Patent
Terao

(10) Patent No.: US 10,761,655 B2
(45) Date of Patent: Sep. 1, 2020

(54) DISPLAY DEVICE, MANAGEMENT DEVICE, MANAGEMENT SYSTEM, AND CONTROL PROGRAM

(71) Applicant: FANUC CORPORATION, Minamitsuru-gun, Yamanashi (JP)

(72) Inventor: Yuuki Terao, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 217 days.

(21) Appl. No.: 16/126,378

(22) Filed: Sep. 10, 2018

(65) Prior Publication Data
US 2019/0107918 A1    Apr. 11, 2019

(30) Foreign Application Priority Data
Oct. 11, 2017 (JP) ................... 2017-197799

(51) Int. Cl.
*G06F 3/041* (2006.01)
*G05B 19/042* (2006.01)
*G06F 3/044* (2006.01)

(52) U.S. Cl.
CPC ......... *G06F 3/0418* (2013.01); *G05B 19/042* (2013.01); *G06F 3/044* (2013.01); *G05B 2219/23377* (2013.01)

(58) Field of Classification Search
CPC ......... G06F 3/0418–04186; G06F 3/044–0448
See application file for complete search history.

(56) References Cited

U.S. PATENT DOCUMENTS

2013/0314302 A1* 11/2013 Jeung ............... G06F 3/1454
  345/2.3
2015/0138210 A1* 5/2015 Amar ................. G06T 1/20
  345/506

(Continued)

FOREIGN PATENT DOCUMENTS

CN     102761662     10/2012
CN     107025029     8/2017

(Continued)

OTHER PUBLICATIONS

Notification of Reasons for Refusal dated Jun. 11, 2019 in corresponding Japanese Patent Application No. 2017-197799.

(Continued)

*Primary Examiner* — Patrick F Marinelli
(74) *Attorney, Agent, or Firm* — Wenderoth, Lind & Ponack, L.L.P.

(57) ABSTRACT

A display device, a management device, a management system, and a control program for switching between an operability emphasis mode where a light touch operation is possible and a high noise resistance mode dynamically depending on an ambient noise state are provided. A display device including a capacitive touch screen includes: a transmitting unit that transmits change amount data of an electrostatic capacitance detected by the touch panel to a management device; and a setting unit that receives an operation mode determined by the management device according to the change amount data and sets a threshold for identifying presence of a touch corresponding to the operation mode to the touch panel.

3 Claims, 3 Drawing Sheets

(56) References Cited

U.S. PATENT DOCUMENTS

| | | | |
|---|---|---|---|
| 2015/0294645 A1* | 10/2015 | Tagaya | G06F 3/0486 |
| | | | 345/173 |
| 2016/0054973 A1* | 2/2016 | Gai | H04W 4/21 |
| | | | 345/173 |
| 2016/0062588 A1* | 3/2016 | Brikman | G06F 3/04845 |
| | | | 715/769 |
| 2016/0140933 A1* | 5/2016 | Pitis | H04L 67/18 |
| | | | 345/173 |
| 2016/0162106 A1* | 6/2016 | Jeon | G06F 3/0416 |
| | | | 345/173 |
| 2019/0025770 A1* | 1/2019 | Okita | G06F 16/211 |
| 2019/0107918 A1* | 4/2019 | Terao | G05B 19/042 |

FOREIGN PATENT DOCUMENTS

| | | |
|---|---|---|
| JP | 2011-90519 | 5/2011 |
| JP | 2011-210038 | 10/2011 |
| JP | 2014-507041 | 3/2014 |
| JP | 2017-21518 | 1/2017 |

OTHER PUBLICATIONS

Notification of Reasons for Refusal dated Oct. 23, 2019 in Japanese Patent Application No. 2017-197799.
Office Action dated Jun. 29, 2020 in Chinese Patent Application No. 201811157966.0.

\* cited by examiner

DISPLAY DEVICE, MANAGEMENT DEVICE, MANAGEMENT SYSTEM, AND CONTROL PROGRAM This application is based on and claims the benefit of priority from Japanese Patent Application No. 2017-197799, filed on 11 Oct. 2017, the content of which is incorporated herein by reference.

BACKGROUND OF THE INVENTION

Field of the Invention

The present invention relates to a system for improving noise resistance of a touch panel.

Related Art

Conventionally, a touch panel is provided in a display device of a machine tool so as to improve convenience of an input operation. In a capacitive touch screen, since an electrostatic capacitance changes when noise is applied as well as when a touch operation is input, a touch operation may be detected erroneously depending on an operation environment and the sensitivity of the touch panel. If a threshold for identifying the presence of a touch is set high, the influence of noise decreases. However, in this case, the sensitivity of the touch panel also decreases, the operability decreases. Therefore, for example, Patent Document 1 provides a technique of changing a threshold on the basis of a noise level predicted from the design of a screen.

Patent Document 1: Japanese Unexamined Patent Application, Publication No. 2011-090519

SUMMARY OF THE INVENTION

However, in a plant where a plurality of machine tools operates, a large amount of noise is generated from machine tools in operation, and particularly, machine tools connected to the same power line are likely to be influenced from each other. Due to this, when a capacitive touch screen is provided in a display device of a machine tool, noise applied to the touch panel changes largely even on the same screen depending on an operating state of a plurality of machine tools. It is difficult to set a threshold for identifying the presence of a touch appropriately depending on the state of noise which changes in this manner.

An object of the present invention is to provide a display device, a management device, a management system, and a control program for switching between an operability emphasis mode where a light touch operation is possible and a high noise resistance mode dynamically depending on an ambient noise state.

(1) A display device (for example, a "control device 10" to be described later) according to the present invention is a display device including a capacitive touch screen and includes: a transmitting unit (for example, a "transmitting unit 11" to be described later) that transmits change amount data of an electrostatic capacitance detected by the touch panel to a management device (for example, a "management device 20" to be described later); and a setting unit (for example, a "setting unit 12" to be described later) that receives an operation mode determined by the management device according to the change amount data and sets a threshold for identifying presence of a touch corresponding to the operation mode to the touch panel.

(2) The display device according to (1) may further include: a switching unit (for example, a "switching unit 13" to be described later) that switches whether the transmitting unit is allowed to transmit the change amount data depending on whether a screen being displayed is an input screen for accepting a touch operation.

(3) A management device (for example, a "management device 20" to be described later) according to the present invention includes: a receiving unit (for example, a "receiving unit 21" to be described later) that receives change amount data of an electrostatic capacitance detected by a capacitive touch screen from a display device (for example, a "control device 10" to be described later) including the touch panel; and a determining unit (for example, a "determining unit 22" to be described later) that determines any one of a plurality of operation modes in which thresholds for identifying presence of a touch are different according to the change amount data and transmits the determined operation mode to the display device.

(4) A management system (for example, a "management system 1" to be described later) according to the present invention is a management system including a display device (for example, a "control device 10" to be described later) provided in each of a plurality of machine tools and having a capacitive touch screen and a management device (for example, a "management device 20" to be described later) communicably connected to the display device, wherein the display device includes: a transmitting unit (for example, a "transmitting unit 11" to be described later) that transmits change amount data of an electrostatic capacitance detected by the touch panel to the management device; and a setting unit (for example, a "setting unit 12" to be described later) that receives an operation mode determined by the management device according to the change amount data and sets a threshold for identifying presence of a touch corresponding to the operation mode to the touch panel, and the management device includes: a receiving unit (for example, a "receiving unit 21" to be described later) that receives the change amount data from the display device; and a determining unit (for example, a "determining unit 22" to be described later) that determines any one of a plurality of operation modes in which the thresholds are different according to the change amount data and transmits the determined operation mode to the display device.

(5) In the management system according to (4), the management device may include a process management unit (for example, a "process management unit 23" to be described later) that issues a machining command preferentially to an area in which a change amount is relatively small on the basis of the change amount data and position information of each of the plurality of machine tools.

(6) A control program according to the present invention is a control program for a machine tool in which the display device according to (1) is provided, wherein the program switches whether the transmitting unit is allowed to transmit the change amount data depending on whether a screen being displayed on the display device is an input screen for accepting a touch operation.

According to the present invention, an operability emphasis mode where a light touch operation is possible and a high noise resistance mode are switched dynamically depending on an ambient noise state in a display device.

DETAILED DESCRIPTION OF THE INVENTION

Figure 1:
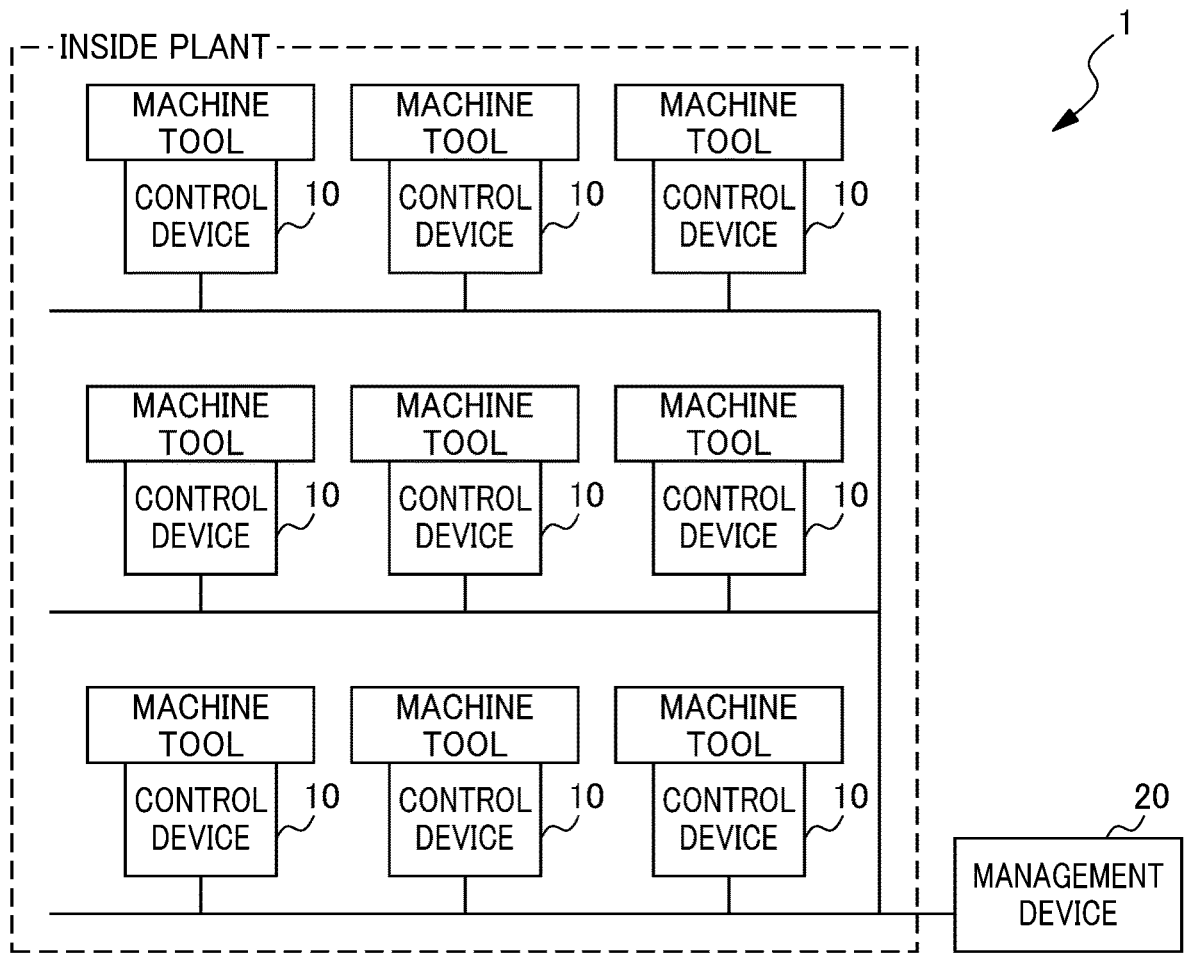
FIG. 1 is a diagram illustrating an overall configuration of a management system according to an embodiment.

Hereinafter, an example of an embodiment of the present invention will be described. FIG. 1 is a diagram illustrating an overall configuration of a management system 1 according to the present embodiment. The management system 1 includes control devices 10 (display devices) of a plurality of machine tools provided in a plant and a management device 20 communicably connected to these control devices 10.

The control device 10 includes a capacitive touch screen as well as a display device for a screen output by a control program for a machine tool and receives user's operations. The control device 10 measures a noise level applied to the touch panel at a predetermined timing and transmits the noise level to the management device 20.

The management device 20 is an information processing device such as a personal computer or a server device. The management device 20 receives the noise levels from the control devices 10 of the plurality of machine tools in the plant and informs each of the control devices 10 of an operation mode corresponding to the noise level. Moreover, the management device 20 manages the operating states of the plurality of machine tools in an integrated manner. The management device 20 determines a priority order of machining commands on the basis of position information and a noise level of each of the machine tools and performs machining process management.

Figure 2:
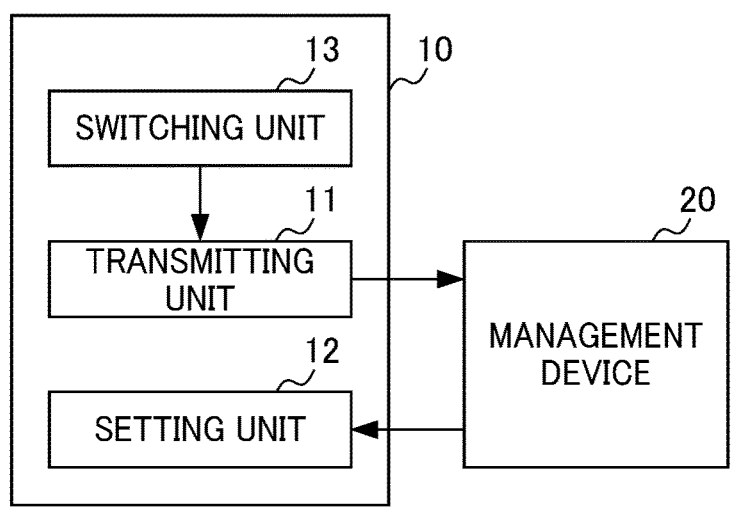
FIG. 2 is a diagram illustrating a functional configuration of a control device according to an embodiment.

FIG. 2 is a diagram illustrating a functional configuration of the control device 10 according to the present embodiment. The control device 10 includes a control unit and a storage unit and the control unit executes software stored in the storage unit to thereby function as a transmitting unit 11, a setting unit 12, and a switching unit 13.

The transmitting unit 11 transmits change amount data of the electrostatic capacitance detected by the touch panel to the management device 20 at predetermined periods. Specifically, the transmitting unit 11 may obtain the statistics of the value of the change amount detected in the entire touch panel or sampling positions to calculate the noise level applied to the entire touch panel and transmit the calculated noise level to the management device 20 as change amount data. Although a change in the electrostatic capacitance due to noise often appears across the entire touch panel, since a change amount at a certain time point varies from position to position, a statistic value such as a maximum value or a square mean is calculated at predetermined periods as a noise level.

In this case, the transmitting unit 11 preferably measures the noise level at a timing at which a touch operation is not performed at any position of the touch panel and transmits the noise level to the management device 20. For example, when a change amount of the electrostatic capacitance protrudes in a partial region of the touch panel, since it is thought that a change associated with a touch is detected, such a change is not suitable for calculation of the noise level. Therefore, the transmitting unit 11 may calculate a noise level when an approximately equal change amount is detected across the entire touch panel and may transmit the noise level to the management device 20.

Upon receiving an operation mode determined by the management device 20 according to the noise level measured by the transmitting unit 11, the setting unit 12 sets a threshold for identifying the presence of a touch to the touch panel in correspondence with the operation mode. Since a touch operation is detected when there is a change exceeding a threshold in the electrostatic capacitance of the touch panel, a touch operation is detected erroneously even when a change amount of the electrostatic capacitance exceeds the threshold due to noise. Therefore, in order to suppress this detection error, the threshold is set high as the noise level increases. Since the smaller the threshold, the higher the detection sensitivity of the touch operation, when the noise level decreases, operability is emphasized and the threshold is returned to a small initial value.

The switching unit 13 switches whether the transmitting unit 11 is allowed to transmit the noise level to the management device 20 depending on whether a screen being displayed by a control program is an input screen for accepting a touch operation. Specifically, the switching unit 13 sets a touch status flag to 1 according to the processing of the control program when the screen is a screen for accepting a touch operation such as a machining program input program or a machining setup screen. On the other hand, the switching unit 13 sets the touch status flag to 0 when the screen is a screen where a touch operation is not accepted such as a screen saver or when the machine tool is performing machining or is in a standby state.

When the touch status flag is 1, the detected change amount of the electrostatic capacitance may contain a change amount associated with a touch operation. In contrast, when the touch status flag is 0, since it is thought that there is no touch operation, the detected change amount of the electrostatic capacitance is a change amount resulting from noise only. Therefore, the transmitting unit 11 calculates the noise level when the touch status flag is 0 and transmits the calculated noise level to the management device 20.

The switching unit 13 may determine a timing at which a touch operation is not performed on the basis of a sensor input of a human detection sensor or the like and may allow the transmitting unit 11 to calculate and transmit the noise level.

Figure 3:
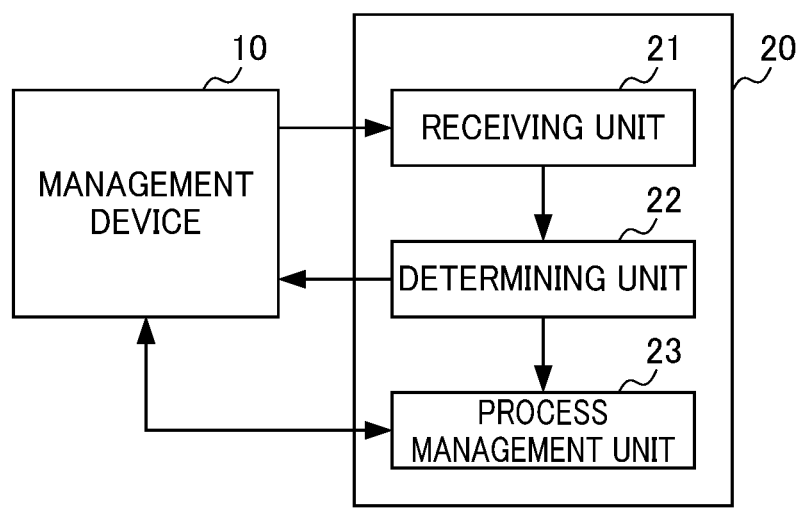
FIG. 3 is a diagram illustrating a functional configuration of a management device according to an embodiment.

FIG. 3 is a diagram illustrating a functional configuration of the management device 20 according to the present embodiment. The management device 20 is an information processing device including an input/output interface and a communication interface in addition to a control unit and a storage unit. The control unit executes software stored in the storage unit to thereby function as a receiving unit 21, a determining unit 22, and a process management unit 23.

The receiving unit 21 receives a noise level applied to the entire touch panel from the control device 10 of each of the machine tools. The determining unit 22 determines any one of a plurality of operation modes in which the thresholds for identifying the presence of a touch are different depending on the noise level received from the control device 10 and transmits the determined operation mode to the control device 10.

The process management unit 23 manages a machining schedule and an operating state of each of the plurality of machine tools in the plant and outputs a machining command to the control device 10 of each of the machine tools.

Moreover, the process management unit 23 may manage an occurrence distribution of noise that influences a touch panel in the plant on the basis of the position information and the noise level of each of the plurality of machine tools and may issue a machining command preferentially to an area where noise is relatively small. In this way, since the noise occurrence source is distributed, the noise level is equalized in the plant and an event in which the noise level in a partial area increases is avoided. In the control device 10 in an area where a machining command is issued, since the threshold for determining a touch operation is low, the operability is improved and the operation efficiency is improved. The position information of the machine tool may be stored in advance in the management device 20 and the receiving unit 21 may receive the position information from the control device 10.

Figure 4:
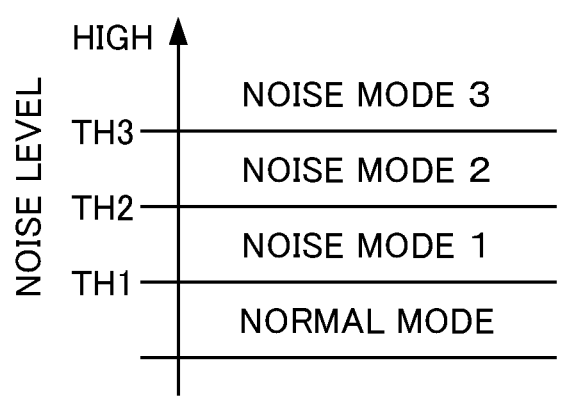
FIG. 4 is a diagram illustrating a relationship between a noise level and an operation mode according to an embodiment.

FIG. 4 is a diagram illustrating a relationship between a noise level and an operation mode according to the present embodiment. The operation mode set to the control device 10 includes noise modes 1 to 3 in addition to a normal mode as an initial state, for example. Any one of these operation modes is selected according to a height of the noise level by comparing the noise level with a plurality of monitoring thresholds TH1 to TH3. Another operation mode in which a touch operation is invalidated when the noise level reaches a predetermined value may be provided. Moreover, in a normal mode where a threshold of the change amount in the electrostatic capacitance for detecting a touch operation is the lowest, since operability is emphasized, a threshold of a change amount capable of detecting a touch operation with a glove may be set.

Figure 5:
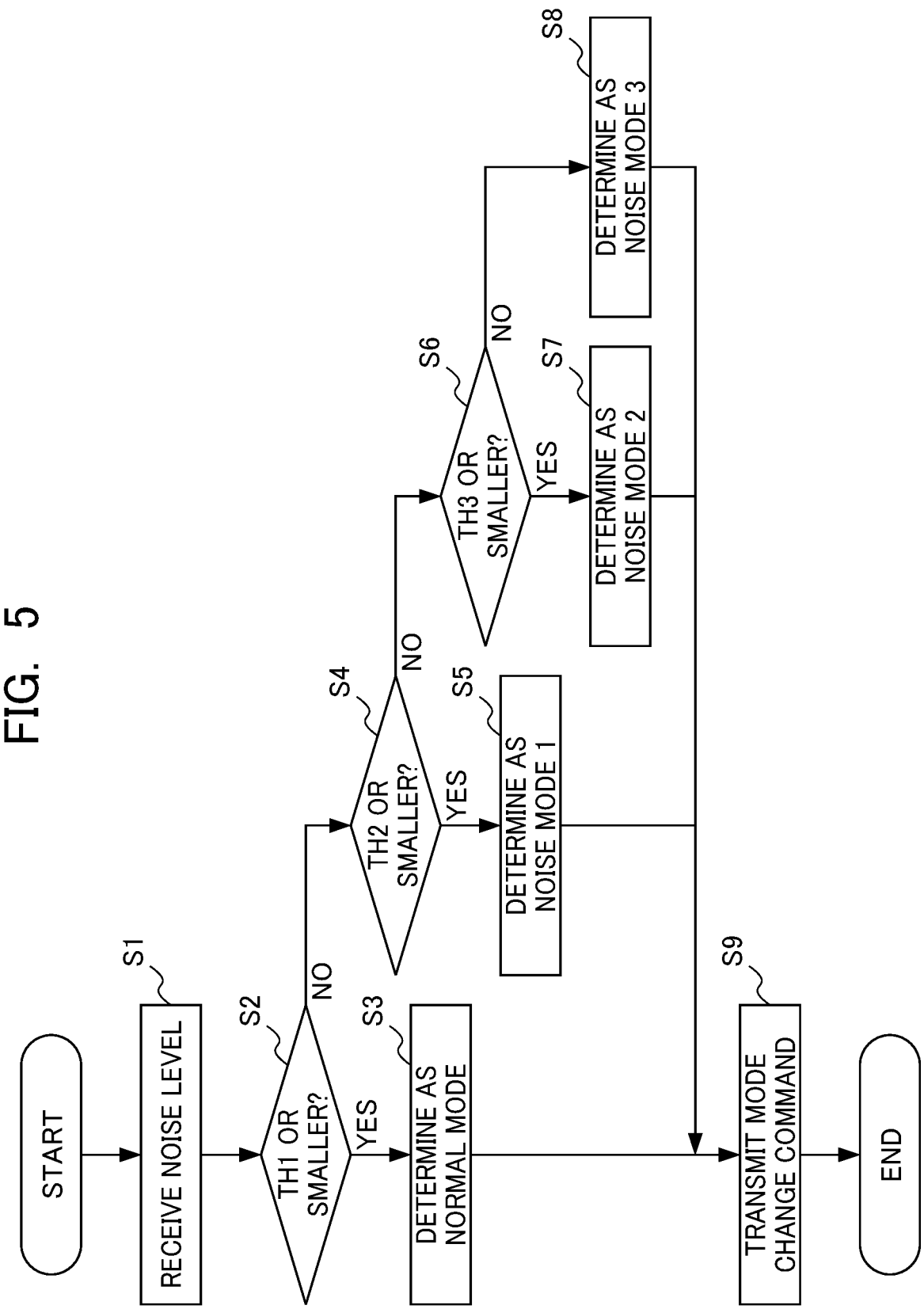
FIG. 5 is a flowchart illustrating a processing example of a management device according to an embodiment.

FIG. 5 is a flowchart illustrating a processing example of the management device 20 according to the present embodiment. This process is executed when a noise level is received from any one of the plurality of management target control devices 10. It is assumed that the operation mode set to the control device 10 includes noise modes 1 to 3 in addition to a normal mode as an initial state, for example.

In step S1, the receiving unit 21 receives a noise level from the control device 10. In step S2, the determining unit 22 determines whether the noise level is equal to or smaller than a first monitoring threshold (TH1). When a determination result of YES is obtained, the flow proceeds to step S3. When a determination result of NO is obtained, the flow proceeds to step S4.

In step S3, the determining unit 22 determines a normal mode which is an initial state as an operation mode of the display device of the control device 10 and stores the determined operation mode together with time information. After that, the flow proceeds to step S9.

In step S4, the determining unit 22 determines whether the noise level is equal to or smaller than a second monitoring threshold (TH2). When a determination result of YES is obtained, the flow proceeds to step S5. When a determination result of NO is obtained, the flow proceeds to step S6.

In step S5, the determining unit 22 determines the noise mode 1 in which a threshold of the electrostatic capacitance for determining the presence of a touch is higher than that of the normal mode as an operation mode of the display device of the control device 10 and stores the determined operation mode together with time information. After that, the flow proceeds to step S9.

In step S6, the determining unit 22 determines whether the noise level is equal to or smaller than a third monitoring threshold (TH3). When a determination result of YES is obtained, the flow proceeds to step S7. When a determination result of NO is obtained, the flow proceeds to step S8.

In step S7, the determining unit 22 determines the noise mode 2 in which a threshold of the electrostatic capacitance for determining the presence of a touch is higher than that of the noise mode 1 as an operation mode of the display device of the control device 10 and stores the determined operation mode together with time information. After that, the flow proceeds to step S9.

In step S8, the determining unit 22 determines the noise mode 3 in which a threshold of the electrostatic capacitance for determining the presence of a touch is higher than that of the noise mode 2 as an operation mode of the display device of the control device 10 and stores the determined operation mode together with time information. After that, the flow proceeds to step S9.

In step S9, the determining unit 22 transmits a command to change the operation mode to any one of the determined operation modes to the target control device 10.

According to the present embodiment, the control device 10 transmits the noise level which is a change amount data of the electrostatic capacitance detected in the entire touch panel to the management device 20. The management device 20 determines an operation mode according to a noise level and the control device 10 sets a threshold for identifying the presence of a touch corresponding to the operation mode. In this way, by setting the threshold to a low value in a normal state where a noise level is lower than a predetermined level, the control device 10 operates in an operability emphasis mode where a light touch operation is possible and a touch operation in a small touch area is recognized as a touch. On the other hand, when the management device 20 determines that noise of a set level or higher is applied, the management device 20 transmits a mode change command to each control device 10, and each control device 10 increases the threshold. In this way, it is possible to improve the noise resistance of a touch panel and to prevent a detection error of the touch operation resulting from noise. Therefore, each control device 10 changes the threshold according to an ambient noise level and dynamically switches between an operability emphasis mode and a noise resistance mode.

The control device 10 determines the presence of a touch operation depending on whether the screen being displayed is an input screen for receiving a touch operation. In this way, the control device 10 can measure the noise level with high accuracy at a timing at which a touch operation is not performed.

The management device 20 can manage a noise occurrence state and a distribution thereof by acquiring the noise level and the position information of the plurality of control devices 10 in the plant together with time information. In this way, since an administrator can easily understand when and where noise occurred, and the level of noise, it is possible to identify the cause of noise. Moreover, the management device 20 can issue a machining command preferentially to an area where noise is relatively small by managing a noise distribution. In this way, since a noise source is distributed, the noise level is equalized in the plant and an event in which the noise level in a partial area increases is avoided. As a result, the management system 1 can reduce the influence of noise and improve noise resistance. Furthermore, in the control device 10 in an area where a machining command is issued preferentially, since the threshold for determining a touch operation is low, the operability is improved and the operation efficiency is improved so that a touch operation with a glove can be input.

While the embodiments of the present invention have been described, the present invention is not limited to the above-described embodiments. The effects described in the present embodiment are only examples of most preferable effects produced by the present invention, and the effects of the present invention are not limited to those described in the present embodiment.

In the present embodiment, the statistic value of the change amount data of the electrostatic capacitance transmitted from the control device 10 to the management device 20 is obtained and is calculated as the noise level. The format of the data transmitted is not limited thereto. The value itself of the change amount in the entire touch panel or at sampling positions may be transmitted and the noise level may be calculated by the management device 20.

A management method by the management system 1 is realized by software. When the method is realized by software, programs that form the software are installed in a computer. These programs may be recorded on a removable medium and be distributed to a user and may be distributed to a user by being downloaded to a computer of the user via a network.

EXPLANATION OF REFERENCE NUMERALS

1: Management system
10: Control device (Display device)
11: Transmitting unit
12: Setting unit
13: Switching unit
20: Management device
21: Receiving unit
22: Determining unit
23: Process management unit

What is claimed is:

1. A management system comprising a display device, having a capacitive touch panel, provided in each of a plurality of machine tools, and a management device communicably connected to the display device,
   each display device comprising:
      a transmitting unit that transmits change amount data of an electrostatic capacitance detected by the touch panel to the management device; and
      a setting unit that receives an operation mode determined by the management device according to the change amount data and sets a threshold for identifying presence of a touch corresponding to the operation mode to the touch panel, and
   the management device comprising:
      a receiving unit that receives the change amount data from each display device; and
      a determining unit that determines any one of a plurality of operation modes in which the thresholds are different according to the change amount data and transmits the determined operation mode to each display device.

2. The management system according to claim 1, wherein each display device further comprises:
   a switching unit that switches whether the transmitting unit is allowed to transmit the change amount data depending on whether a screen being displayed is an input screen for accepting a touch operation.

3. The management system according to claim 1, wherein the management device includes a process management unit that issues a machining command to an area in which a change amount is relatively small on the basis of the change amount data and position information of each of the plurality of machine tools.

* * * * *